Inventors
G. A. Lee
A. R. Smith
C. J. Hopkins
By Glascock Downing Neble
Attys

Oct. 25, 1949.  A. R. SMITH ET AL  2,486,069
ENVELOPE FEEDING MECHANISM WITH SLIDABLY
AND PIVOTALLY MOUNTED GRIPPER ARMS
Filed Jan. 13, 1948  6 Sheets-Sheet 5

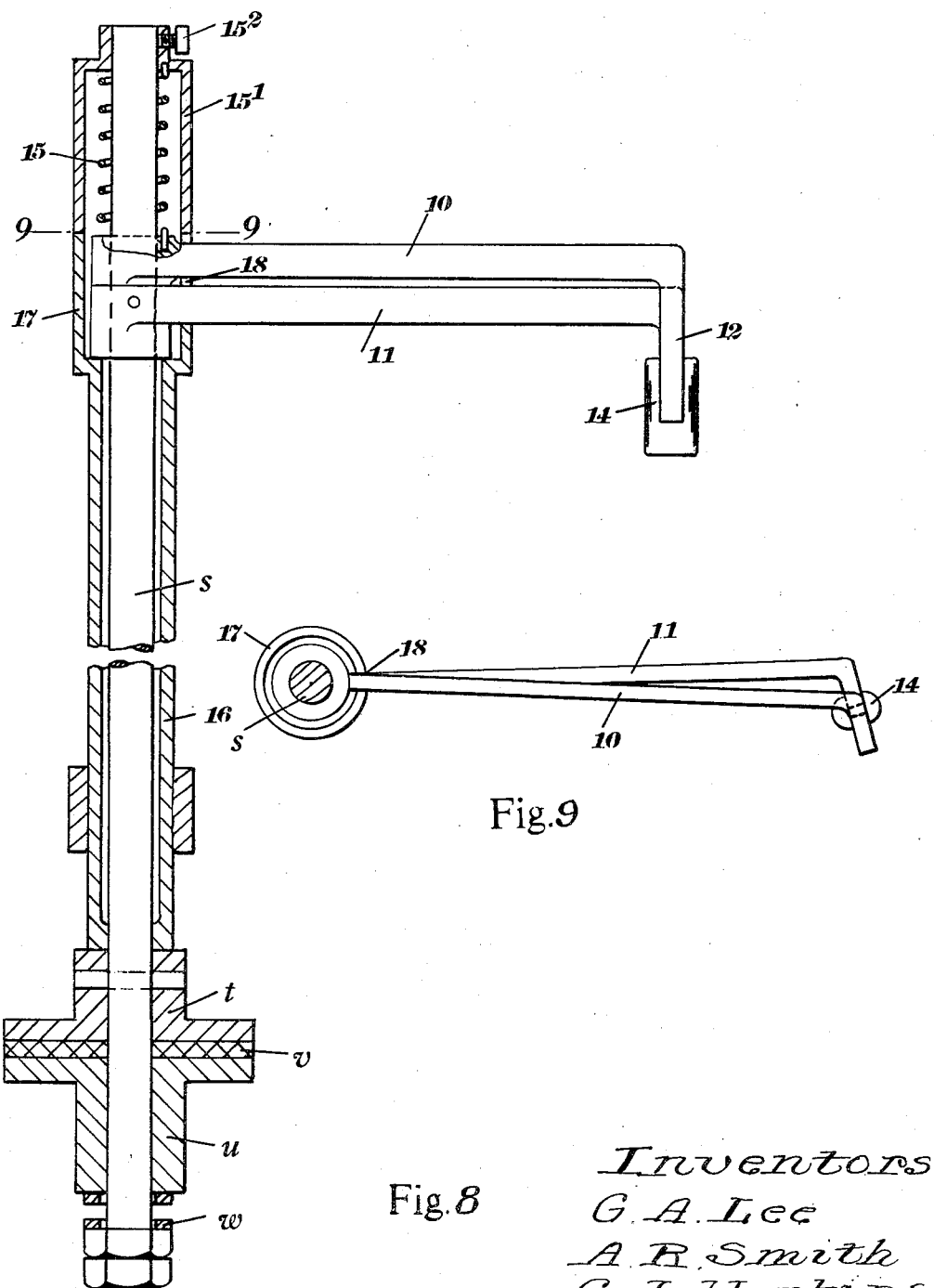

Patented Oct. 25, 1949

2,486,069

UNITED STATES PATENT OFFICE 2,486,069

ENVELOPE FEEDING MECHANISM WITH SLIDABLY AND PIVOTALLY MOUNTED GRIPPER ARMS

Arthur Ronald Smith, Birmingham, and George Arthur Lee and Cyril J. Hopkins, Cuffley, England Application January 13, 1948, Serial No. 2,068
In Great Britain December 30, 1942

Section 1, Public Law 690, August 8, 1946
Patent expires December 30, 1962

6 Claims. (Cl. 226—49)

This invention relates to automatic machines of the kind employed for inserting weighed or measured quantities of seeds, or granular, powdered or like materials into small paper bags or envelopes hereinafter generically termed envelopes.

The primary object of the invention is to provide an improved mechanism for transferring the envelopes individually from a receptacle to a rotary work table. A further object of the invention is to provide improved means for attaching and releasing the envelopes to and from the work table.

The invention comprises the combination with a rotary work table and an envelope receptacle, of a vertical spindle, a pair of gripper arms carried by the spindle and adapted to transfer envelopes individually from the receptacle to the table, one of the arms being secured to the spindle and the other being connected to the spindle by a torsion spring, a hollow actuating spindle surrounding a portion of the gripper-arm spindle, the hollow spindle being adapted to impart angular movements to the arms and to permit a small amount of relative angular movement between the arms, a friction device acting on the gripper-arm spindle, means for oscillating the hollow spindle, and means for imparting vertical movements to the spindles.

Also the invention comprises the combination with the rotary work table, of a plurality of envelope clips situated at the positions at which the envelopes are to be attached, and a cam for actuating the clips.

In the accompanying sheets of explanatory drawings:

Figures 8 and 9 are respectively a sectional side elevation and a sectional plan, drawn to a larger scale than Figures 1 to 7, of the means employed for transferring the envelopes from the receptacle to the work table, Figure 9 being taken on the line 9—9 of Figure 8.

Figure 1:
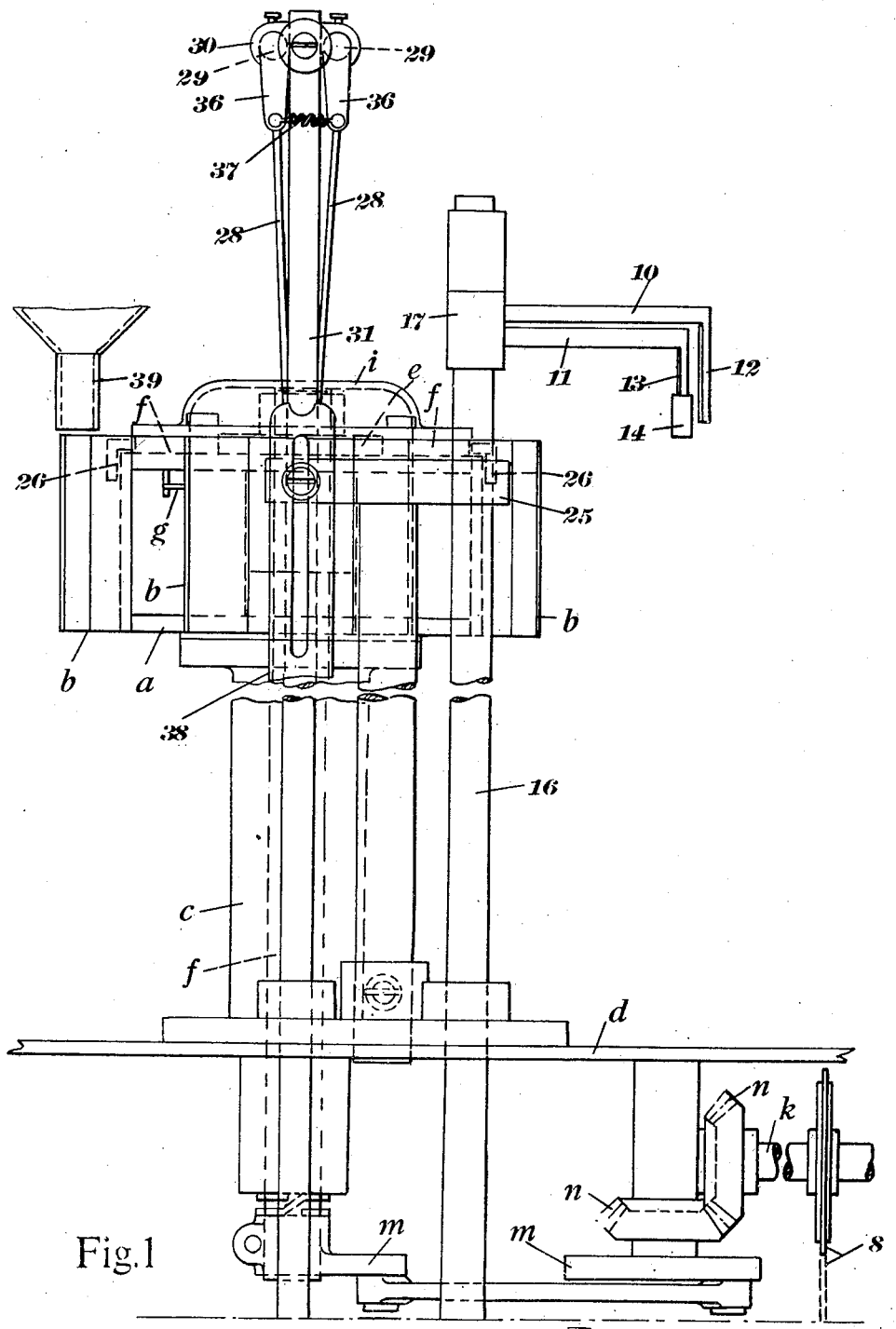
Figures 1 and 2 are side elevations taken at right angles to each other of the upper part, Figures 3 and 4 corresponding side elevations of the lower part, and Figure 5 a part sectional plan, of an automatic machine constructed in accordance with the invention.
Figure 2:
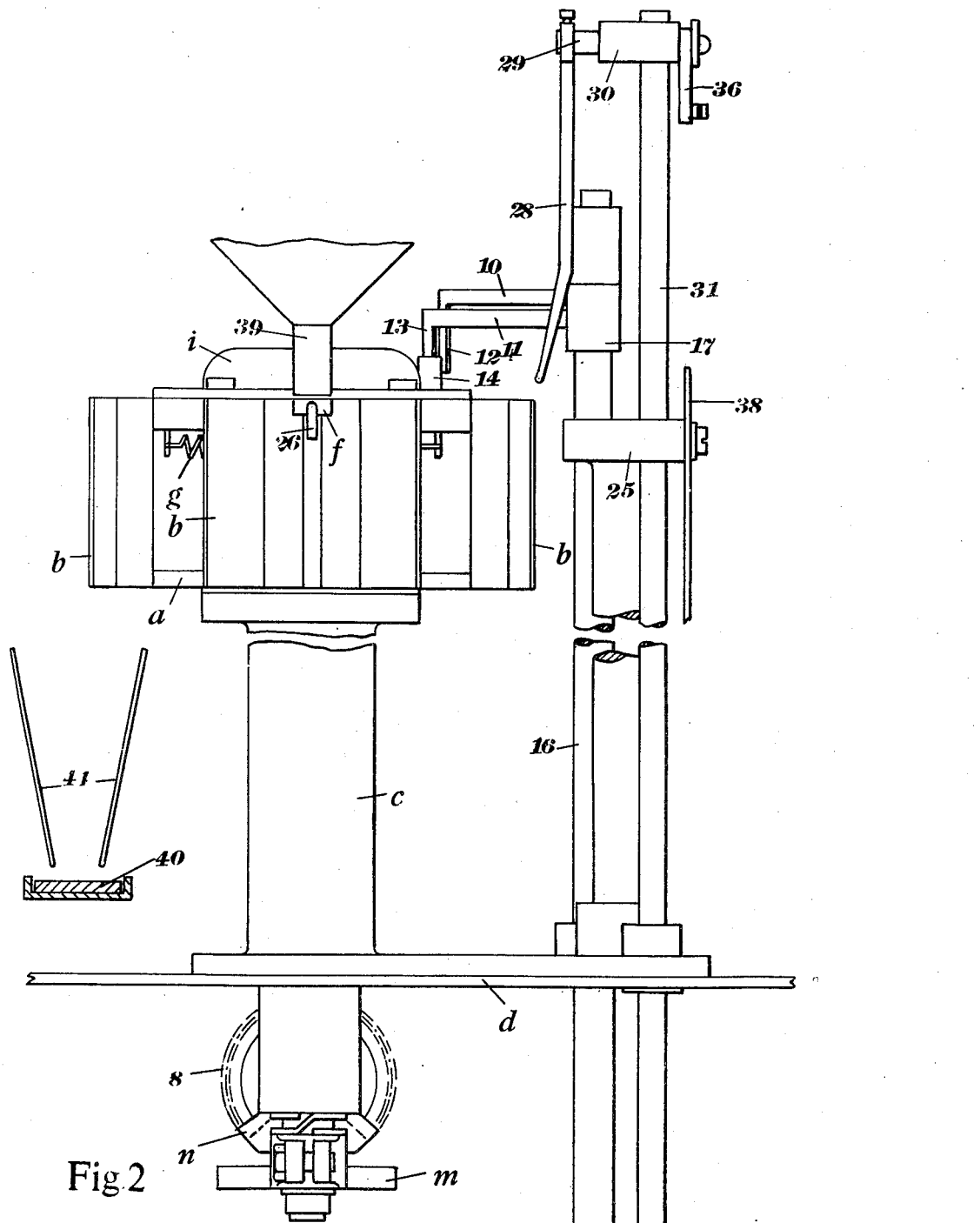
Figure 3:
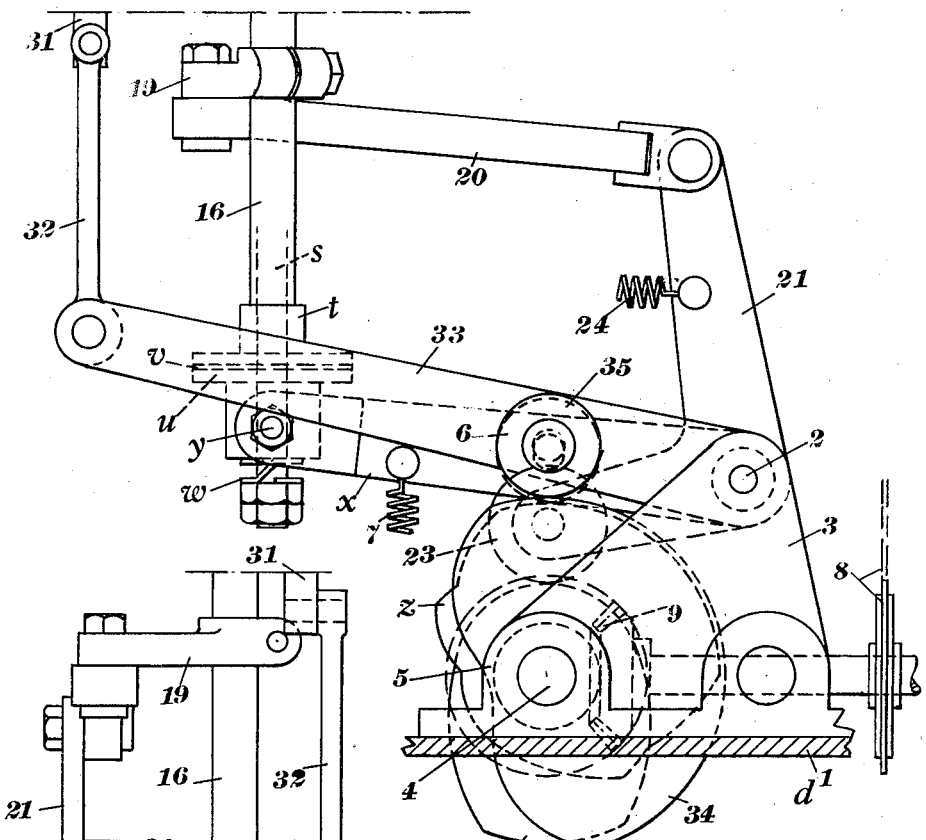
Figure 4:
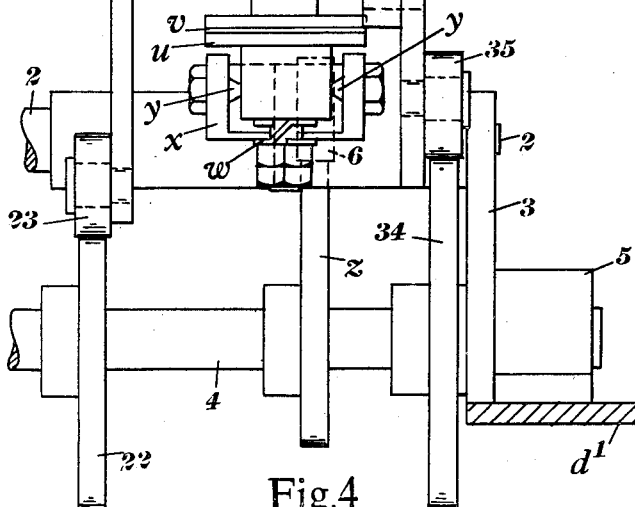
Figure 5:
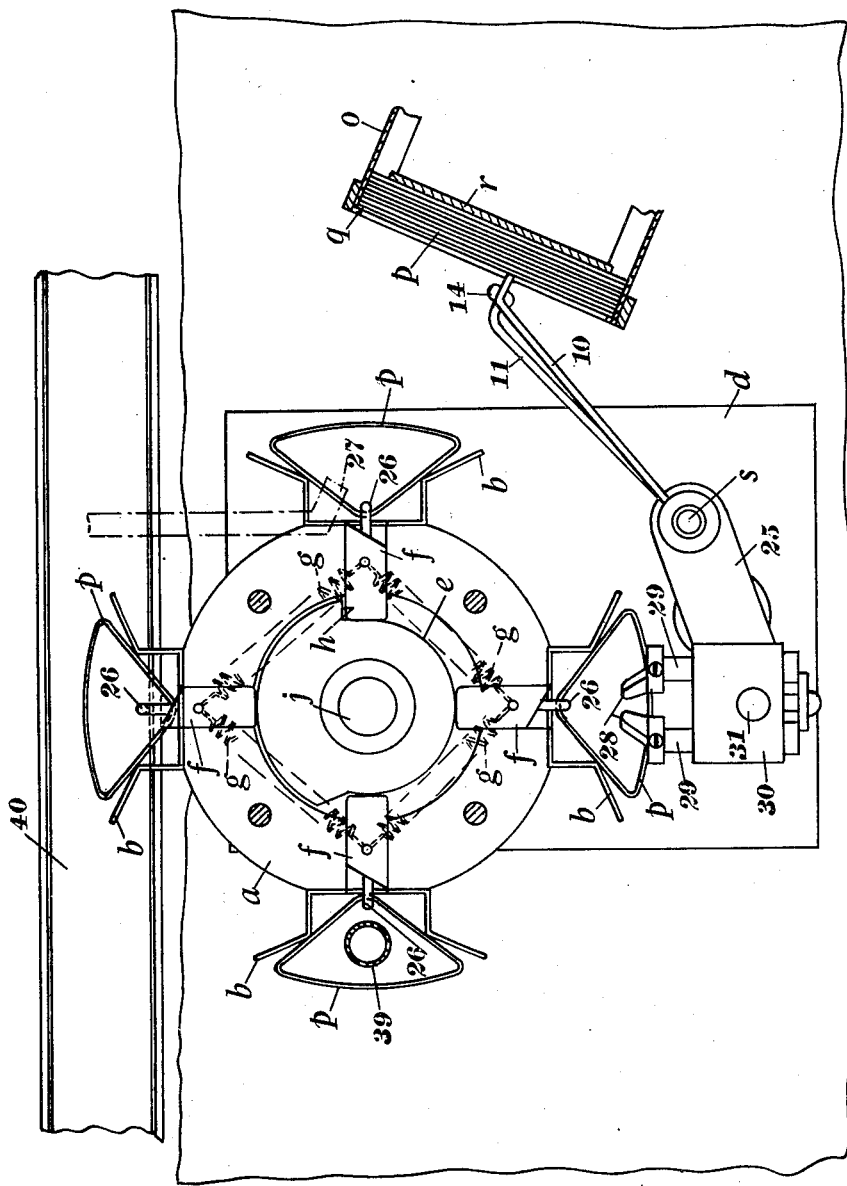
Figure 6:
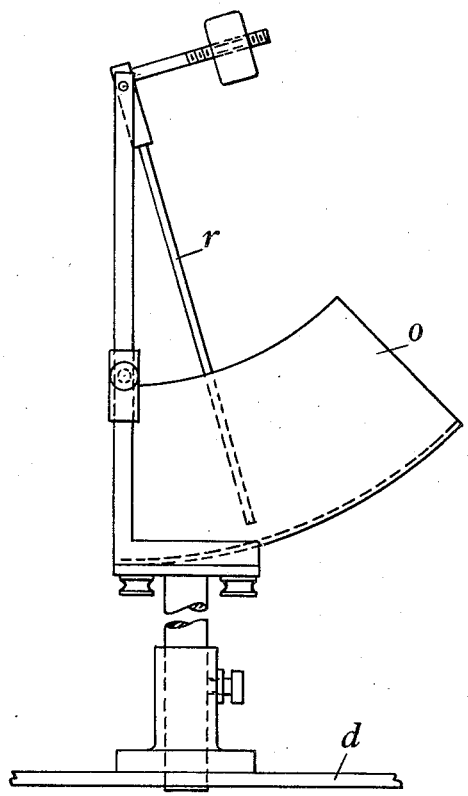
Figures 6 and 7 are respectively a side elevation and a plan of the envelope receptacle.
Figure 7:
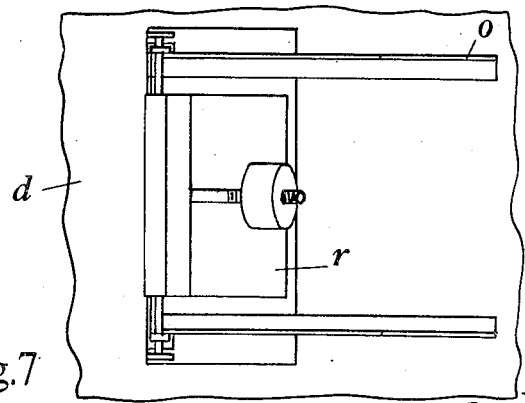

In carrying the invention into effect as shown, we employ a rotary table $a$ adapted to carry an envelope through four stages, these stages being such that an envelope is attached to the table at the first, is fully opened at the second, is charged at the third, and released at the fourth, in the manner hereinafter described. The periphery of the table $a$ is provided with four shallow pockets $b$ situated at 90° apart and each adapted to receive an envelope. These pockets may be made from sheet metal and secured to the periphery of the table, or they may have the form of recesses in the table periphery, but in either case the pockets have diverging side walls. The table $a$ is rotatably supported on the upper end of a hollow pedestal $c$ which at its lower end is secured to a fixed horizontal plate $d$. Unidirectional angular movements are imparted intermittently to the table $a$ by any convenient means which in the example shown comprise an oscillatory cam $e$ arranged in a central recess in the upper surface of the table, and pawls $f$ slidably mounted in radial recesses formed in the upper surface of the table around the central recess, the pawls being loaded by springs $g$ which serve to retain the inner ends of the pawls in contact with the cam periphery, and being alternately engageable by a shoulder $h$ on the cam during successive movements of the cam in one direction. A cover piece $i$ secured on the upper surface of the table $a$ serves to enclose the open upper sides of the recesses containing the cam $e$ and pawls $f$. The cam $e$ is secured on the upper end of a vertical operating spindle $j$ which passes through a central hole in the table $a$ and through the hollow pedestal $c$, the lower end of this spindle being connected to a driving spindle $k$ through crank mechanism $m$ and bevel gearing $n$, the arrangement being such that rotary motion of the driving spindle causes the cam-operating spindle to be oscillated through an angle of slightly more than 90°. Motion is imparted to the driving spindle $k$ from any convenient source, such as an electric motor (not shown).

Alongside and at a position below the level of the table $a$ there is adjustably mounted on the plate $d$ a trough-like receptacle $o$ of segmental shape adapted to hold a stack of envelopes $p$, each envelope in the stack being arranged with its mouth upper-most and with its flap extending from the mouth. At the front and open end of the receptacle $o$ a narrow ledge $q$ is formed or secured at each of the two vertical edges of the receptacle to hold the envelopes $p$ in position, and the stack of envelopes are pressed forward towards this end by a weighted lever $r$ acting on the rear of the stack.

At a position adjacent to the space between the table $a$ and the receptacle $o$ is arranged a vertical and axially slidable spindle s. Near the lower end of this spindle s is secured a collar t having a flat under-face, and beneath this collar is freely mounted on the spindle another (and non-rotatable) collar u having a flat upper face. Between and in contact with the adjacent flat faces of the collars t, u is arranged a disc v of friction material. The lower collar u is pressed towards the upper collar by an adjustable spring w mounted on the lower end of the spindle s, and is engaged with one end of an operating lever x through the medium of a pair of diametrically opposite pivots y. The purpose of the lever x is to impart vertical (up and down) movements to the spindle s, the latter being actuated at appropriate times in the successive cycles of operation by a suitably shaped cam z. At the end remote from the pivots y the lever x is freely mounted on a horizontal shaft 2, the latter being supported by bearings as 3 on a horizontal plate $d^1$ below the above mentioned plate d. Arranged adjacent to and parallel with the shaft 2 is cam-shaft 4 on which the cam z is secured, the cam-shaft being journalled in bearings as 5 on the plate $d^1$. The lever x carries a roller 6 which bears on the periphery of the cam z under the action of a spring 7. Motion is imparted to the cam-shaft 4 from the driving spindle k through the medium of chain-and-sprocket mechanism 8 and bevel gearing 9.

Near the upper end of the spindle s are arranged a pair of laterally extending gripper arms 10, 11 which terminate at their outer ends in depending fingers 12, 13. The finger 12 has a thin lower end adapted to enter easily into the open mouth of an envelope p in the receptacle o, and on the lower end of the other finger 13 is provided a soft rubber or other pad 14. The arm 11 carrying the finger 13 is secured to the spindle s. The other arm 10 is connected to the spindle s through an adjustable torsion spring 15 which surrounds the upper end of the spindle and tends to move the fingers 12, 13 apart, one end of this spring being anchored to the arm 10, and the other end being anchored to a short sleeve $15^1$ which is adjustably secured on the upper end of the spindle s by a set-screw $15^2$.

Surrounding the portion of the spindle s between the arms 10, 11 and the upper collar t, is mounted a hollow actuating spindle 16. At its upper end the hollow spindle 16 has formed on or secured to it a stirrup-like part 17 which embraces the adjacent ends of both arms 10, 11. The arms 10, 11 extend through an opening 18 in one side of the stirrup-like part 17, and the width of this opening is made such as will allow sufficient relative angular movements between the arms to allow the fingers 12, 13 to separate to the required extent. To the hollow spindle 16 is secured a laterally extending arm 19 which is connected by a link 20 to an operating lever 21 freely mounted on the shaft 2. The lever 21 is adapted to be actuated at appropriate intervals by a suitably shaped cam 22 on the cam-shaft 4, and for this purpose carries a roller 23 which bears on the periphery of the cam under the action of a spring 24 secured to the lever.

The lower end of the hollow spindle 16 may rest on the upper side of the upper collar t abovementioned, and both spindles s and 16 are supported in part by the above-mentioned pivots y and by a fixed guide bearing 25 embracing the upper part of the hollow spindle 16.

The action of the mechanism so far described is as follows:

By means of the hollow spindle 16 the gripper arms 10, 11 are first swung to a position such that the finger 12 lies over the open end of the envelope p which is adjacent to the delivery end of the envelope receptacle o. The arms 10, 11 are then lowered by downward movement of the spindles s, 16 so as to cause the thin finger 12 to enter the envelope. Then a return movement is given to the hollow spindle 16. The first effect of this movement is to cause the spring controlled arm 10 to be moved towards the other 11 (which is temporarily held by the friction between the two collars t, u) and so cause the front side of the envelope to be gripped between the fingers 12, 13. Continued movement of the arms 10, 11 causes the envelope p to be withdrawn from the receptacle o and transferred to the adjacent pocket b of the table a. Finally an upward movement is given to the spindles s, 16, but as the front side of the envelope p carried by the fingers 12, 13 is now arrested by one of a plurality of clips 26 on the table a the effect of this movement is to cause the fingers 12, 13 to be carried clear of the envelope.

At the beginning of the next swing of the arms 10, 11, the friction between the collars t, u temporarily retards the arm 11 secured to the inner spindle s and allows the other arm 10 to move under its spring action for separating the fingers 12, 13 in readiness for engagement with the next envelope.

As regards the clips 26 for securing the envelopes to the table a, one such clip is provided at the inner end of each of the pockets b. These clips may have any convenient form, and in the example shown consist of hook-like projections on the outer ends of the spring-loaded pawls f above mentioned, the associated cam e being adapted to impart outward movements to the clips through the pawls against the action of the springs g associated with the pawls. When an envelope is transferred by the gripper arms 10, 11 to a pocket b in the table a, the upper edge of the front portion of the envelope is brought under the corresponding clip 26, and then immediately clamped by the clip against the inner end of the pocket as a consequence of the ensuing angular movement of the cam e relatively to the table a, this movement of the cam being in the direction opposite to that required for imparting movement to the table, and being hereinafter referred to as the return movement of the cam. To ensure that such movement of the cam e has no effect on the position of the table a, any convenient friction material may be arranged between the underside of the table and the upper end of the pedestal c. When the envelope is engaged by the clip, the fingers 12, 13 are withdrawn from the envelope, and the mouth of the envelope is opened by compressed air from a nozzle 27.

During the next movement of the cam e in the forward direction, that is to say the direction for moving the table a, the shoulder h on the cam serves by engaging the pawl f associated with the envelope-engaging clip 26 to move the table to the position in which the envelope can be fully opened by a vertically movable spreader. This latter comprises a pair of arms 28 depending from and respectively secured at their upper ends to a pair of short horizontal pivot spindles 29, the latter being journalled in a bearing 30 on the upper end of a vertical and axially slidable spindle 31 which passes through the plate d above mentioned, and is supported by the fixed guide bearing 25. The lower end of the spindle 31 is connected by a link 32 to one end of a lever 33 which at its other end is freely mounted on the horizontal shaft 2, and which is operable at appropriate intervals by a cam 34 on the cam-shaft 4 to cause vertical movement of the spindle, the lever carrying a roller 35 which rests on the periphery of the cam. Also depending from and respectively secured at their upper ends to the pivot spindles 29 are a pair of short levers 36 which are interconnected by a tension spring 37. When the vertical spindle 31 is in its upper position the spring 37 serves by its action on the levers 36 to hold the spreader arms 28 in their inner positions in which the lower ends of these arms lie close to each other, and when an envelope is carried by the table to a position beneath the arms, downward movement of the spindle causes the arms to enter the open mouth of the envelope. The extent of this movement is such that the lower ends of the spreader arms 28 can move into the lower end of the envelope, whereupon an abutment 38 serves by contact with the outer ends of the levers 36 to spread the arms apart, the abutment having the form of a vertical metal piece which is adjustably supported by the fixed guide bearing 25, and which at its upper end is shaped (as shown in Figure 1) to separate the said levers when the latter reach an appropriate position. The spreading apart of the arms 28 serves to open the envelope fully.

During the next forward movement of the cam e its shoulder h serves by engaging the next pawl f to move the table a to the position in which the charge is introduced into the envelope through a nozzle 39 from an automatic weighing or measuring machine under the control of any convenient cam (not shown).

The next forward movement of the cam e serves to move the table a into the position in which the envelope is situated above a table or conveyor as 40, and during its ensuing return movement the cam imparts outward movement to the pawl f carrying the envelope-engaging clip 26, thus releasing the envelope and allowing it to fall between a pair of guides 41 on to the table or conveyor.

It will be understood that when the machine is in operation envelopes are successively transferred from the receptacle o and passed through the four stages above described, and that whilst one envelope is passing through one stage others are passing through the other stages.

By virtue of the adjustability of the receptacle o and the spreader abutment 38, the machine above described is suitable for charging envelopes of different sizes.

By this invention the placing into envelopes of weighed or measured small quantities of materials such as have already been mentioned is effected in a very simple, expeditious and reliable manner. The invention is not, however, restricted to the example described as subordinate details may be varied to suit different requirements.

Having thus described our invention what we claim as new and desire to secure by Letters Patent is:

1. An automatic machine of the kind specified, comprising the combination with a rotary work table and an envelope receptacle, of a vertical spindle, a pair of gripper arms carried by the spindle and adapted to transfer envelopes individually from the receptacle to the table, one of the arms being secured to the spindle, a torsion spring connecting the other arm to the spindle, a hollow actuating spindle surrounding a portion of the gripper-arm spindle, the hollow spindle being adapted to impart angular movements to the arms and to permit a small amount of relative angular movement between the arms, a friction device acting on the gripper-arm spindle for temporarily holding the arm secured thereto against angular movement with the hollow spindle, to permit the said relative movement between the arms, means for oscillating the hollow spindle, and means for imparting vertical movements to the spindles.

2. An automatic machine as claimed in claim 1 and having in combination with the rotary work table, a plurality of envelope clips situated at the positions at which the envelopes are to be attached, and a cam for actuating the clips.

3. An automatic machine as claimed in claim 1 and having in combination a vertically movable spreader adapted to enter and open the envelopes transferred to the table, and means for actuating the spreader.

4. An automatic machine as claimed in claim 1 in which the table is provided around its periphery with a plurality of pockets for receiving the envelopes transferred to the table from the receptacle.

5. An automatic machine as claimed in claim 1, and having in combination a vertically movable spreader adapted to enter and open the envelopes transferred to the table, and an adjustable abutment for actuating the spreader.

6. An automatic machine as claimed in claim 1 and having in combination with the table, radially slidable and spring loaded pawls, envelope clips at the outer ends of the pawls, a cam arranged to cooperate with the inner ends of the pawls for actuating the clips and imparting intermittent unidirectional movements to the table, and means for imparting oscillatory movement to the cam.

ARTHUR RONALD SMITH.
GEORGE ARTHUR LEE.
CYRIL J. HOPKINS.

REFERENCES CITED

The following references are of record in the file of this patent:

UNITED STATES PATENTS

| Number | Name | Date |
|---|---|---|
| 977,632 | Hoyt | Dec. 6, 1910 |
| 1,101,492 | Gwinn | June 23, 1914 |
| 2,032,259 | Chandler | Feb. 25, 1936 |